United States Patent [19]

Nixon, Jr.

[11] Patent Number: 4,894,043

[45] Date of Patent: Jan. 16, 1990

[54] TORQUE TRANSMITTING COUPLER WITH SHEAR CAPABILITY AND COMPONENT SEPARATION CONTAINMENT

[76] Inventor: Robert E. Nixon, Jr., 3138 Riddle Rd., West Palm Beach, Fla. 33406

[21] Appl. No.: 153,980

[22] Filed: Feb. 9, 1988

[51] Int. Cl.⁴ ............................................... F16D 9/00
[52] U.S. Cl. .......................................... 464/33; 403/2
[58] Field of Search ............... 403/2, 11, 292, 300, 403/306; 464/30, 32, 33, 48

[56] References Cited

U.S. PATENT DOCUMENTS

| | | | |
|---|---|---|---|
| 1,574,466 | 2/1926 | Brown | 464/33 |
| 1,610,414 | 12/1926 | Bernard et al. | 403/2 X |
| 1,637,944 | 8/1927 | Keller | 464/33 |
| 3,505,833 | 4/1970 | Reak | 464/33 X |
| 3,525,225 | 8/1970 | Yager et al. | 464/33 X |
| 3,753,625 | 8/1973 | Fabrizio et al. | 464/33 X |
| 4,185,477 | 1/1980 | van der Lely et al. | 464/33 X |

FOREIGN PATENT DOCUMENTS

| | | | |
|---|---|---|---|
| 60-44622 | 3/1985 | Japan | 464/32 |
| 90755 | 11/1937 | Sweden | 464/33 |

*Primary Examiner*—Daniel P. Stodola
*Attorney, Agent, or Firm*—Albert L. Jeffers; Anthony Niewyk

[57] ABSTRACT

A torque transmitting coupler drivingly connects a rotary drive mechanism, such as a earth boring auger, and a rotary driven tool, such as a screw anchor. The coupler includes driving and driven members. The driving member has thereon a drive mechanism connector and a driving plate. The driven member has thereon a tool connector and a driven plate. The coupler also includes a swivel connecting device which interconnects the driving and driven members together in a coupled relation such that the members are rotatable relative to one another and the respective driving and driven plates are disposed in end-to-end contacting relation to one another. A pair of shearable pins interconnect the drive and driven plates together so as to cause transmitting of torque from one of the members to the other via the respective plates. The shearable pins are designed to shear at a predetermined torque load imposed thereon by one of the members via its respective plate. A disk is attached to each shearable pin and a retainer plate is disposed adjacent to the driving plate to receive the shearable pins and capture and maintain the pins via their disks adjacent the one plate both before and after the pin has been sheared. Spring-loaded posts on the driving plate movably mount the retainer plate so as to receive the shearable pin and overlie the disks thereon.

6 Claims, 3 Drawing Sheets

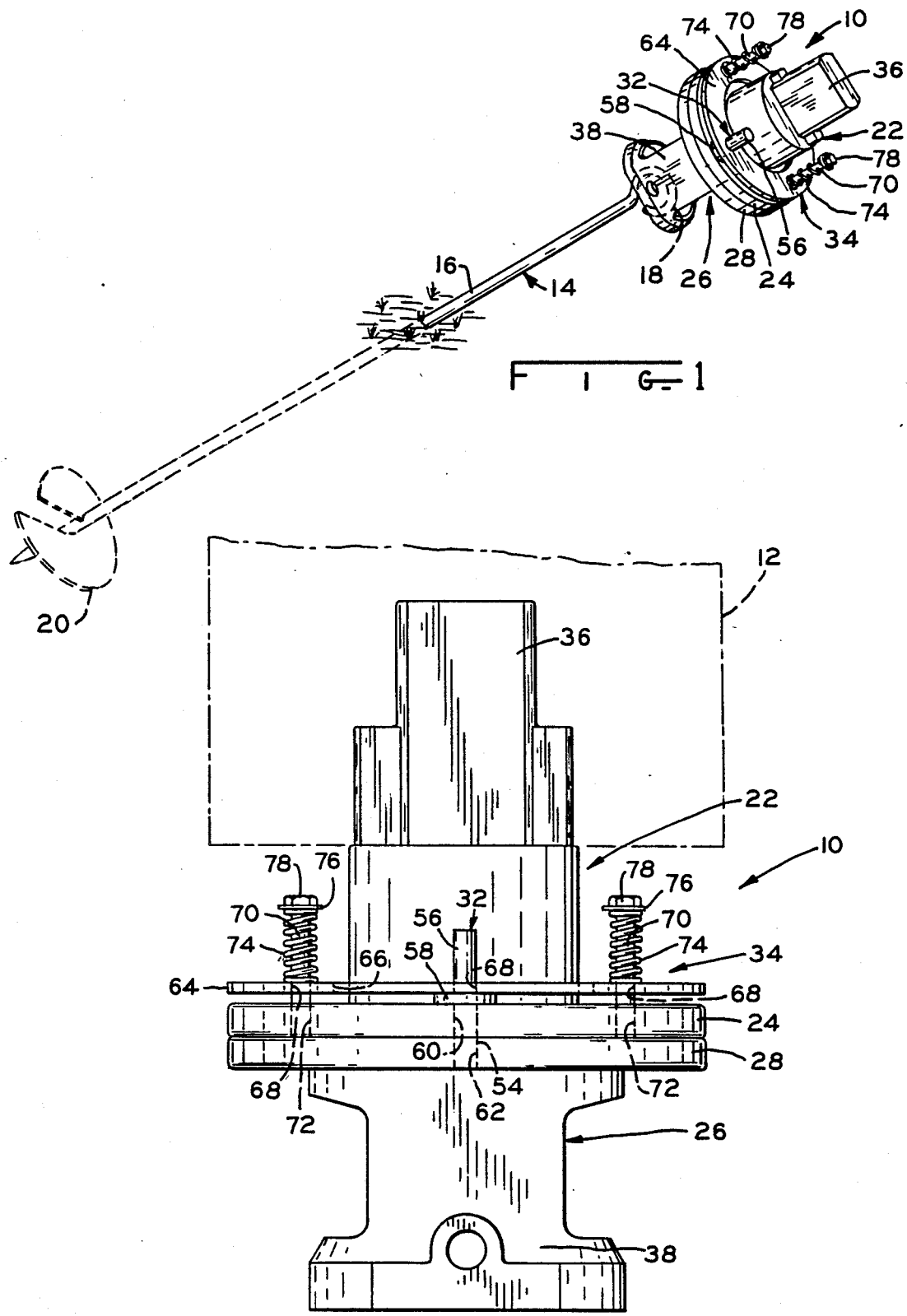

TORQUE TRANSMITTING COUPLER WITH SHEAR CAPABILITY AND COMPONENT SEPARATION CONTAINMENT

BACKGROUND OF THE INVENTION

1. Field of the Invention

The present invention generally relates to couplers for transmitting torque from a rotary drive mechanism to a rotary driven tool and, more particularly, is concerned with a torque transmitting coupler incorporating torque transmission, shear capability and component separation containment features.

2. Description of the Prior Art

It has long been the practice in the utility industry to drive screw anchors into the ground near utility poles to provide anchorage for guy wires and cables. A typical screw anchor is composed of an elongated rod having an eye formed on its upper end and a helix-shaped auger blade attached on its pointed lower end.

Tractor-mounted and hand-held devices are known which could be adapted for use in installing screw anchors into the ground. Representative of the prior art are the devices disclosed in U.S. Pat. Nos. 3,343,612 to Flowers, 3,961,671 Adams et al and 4,057,114 Anderson.

The preferred approach for installing screw anchors is to use the end of the same truck-mounted earth boring auger that was used to dig the hole for the utility pole. As disclosed in a U.S. Pat. No. 2,883,223 to Petersen, typically a screw anchor adapter is employed for coupling the anchor rod upper end to a pilot tip of the earth boring auger. The use of the utility truck-mounted earth boring auger as the driver for installing screw anchors into the ground has proven to be a relatively safe acceptable practice since a pushing force directed toward the ground is being employed. Should a screw anchor hit an obstacle and fracture while being set into the ground, the downward direction of the force being applied by the earth boring auger minimizes the possibility of components coming apart and causing damage or injury.

However, the same practice has not been allowed up to the present time for recovery or removal of screw anchors from the ground. To remove screw anchors a pulling force directed away from the ground must be employed. Should the screw anchor be hung up in the ground and fracture while being turned and pulled by the earth boring auger, the upward direction of the force being applied by the auger increases the possibility of components coming apart and flailing about so as to subject equipment and persons nearby to damage and injury. As a result, present practice to recover a screw anchor has been to drill holes with the earth boring auger or with a back hoe on either side of the anchor in order to loosen it and dig it out. This is time-consuming and required replacement of the soil removed once the anchor is removed.

It is still perceived that a utility truck-mounted earth boring auger is the most desirable and practical drive mechanism to use in removing screw anchors. Torque overload protective couplers and adapters have been disclosed over the years in the prior patent art, such as in U.S. Pat. Nos. 2,819,635 to Better et al, 3,735,625 Fabrizio et al, 4,086,012 Buckley et al and 4,447,217 Blandford. However, none of these devices appear to provide suitable low-hazard means to connect the earth boring auger to a screw anchor for removal of the same. Consequently, there still exists a pressing need to devise a way to eliminate the hazards associated heretofore with use of the utility truck-mounted earth boring auger in such manner.

SUMMARY OF THE INVENTION

The present invention provides a torque transmitting coupler designed to satisfy the aforementioned needs. The coupler of the present invention incorporates several features which limit the level of torque transmitted to drive a tool, eliminate the overall likelihood of components separating from one another, and reduce the possibility of broken or sheared parts being ejected from the coupler and thereby causing damage or injury.

One feature relates to an assembly of coupler parts having elements connecting the parts together in a torque transmitting relation wherein the connecting elements are shearable in order to limit the magnitude of torque transmitted. Another feature relates to a swivel connecting means provided in the assembly of parts which will maintain them connected together after the connecting elements have sheared. Still another feature relates to the configuration of the shearable connecting elements and to a retainer assembly associated with such shearable elements which makes it easy to replace the sheared elements but prevents unintended release and ejection of the sheared elements from the coupler.

Accordingly, the present invention is directed to a torque transmitting coupler for drivingly connecting a rotary drive mechanism and a rotary driven tool. The torque transmitting coupler comprises:

(a) a driving member having opposite inner and outer portions with a drive connector formed on the outer portion thereof and a driving structure rigidly attached on the inner portion thereof;

(b) a driven member having opposite inner and outer portions with a tool connector formed on the outer portion thereof and a driven structure rigidly attached on the inner portion thereof;

(c) a swivel connecting means interconnecting the driving and driven members together in a coupled relation at their respective inner portions such that the members are rotatable relative to one another about a common axis and the respective drive and driven structures thereon are disposed in an adjacent relation to one another;

(d) at least one shearable element interconnecting the drive and driven structures together so as to cause transmitting of torque from one of the members to the other via the respective structures, the element being designed to shear at a predetermined torque load imposed thereon by one of the members via one of the structures;

(e) retaining means for capturing and maintaining the element adjacent the one structure both before and after the element has been sheared; and, (f) the swivel connecting means interconnecting the driving and driven members so as to maintain them together in the coupled relation even after shearing of the shearable element.

More particularly, the driving and driven structures are annular plates attached on the respective driving and driven members and encompassing and extending radially outwardly from the members. The shearable element is in the form of a pin having an annular disk attached thereabout between opposite end portions of the pin. Each of the plates has at least one hole being alignable with the hole of the other plate for receiving one end portion of the shearable pin. The disk on the pin is part of the retaining means. The retaining means also relates to an annular retainer plate having a hole for receiving the other end portion of the pin. The retainer plate is mounted by spring-loaded posts attached on one of the driving and driven plates. The retainer plate receives the other end portion of the pin and overlies the disk on the shearable pin, thereby capturing the other end portion of the pin and its disk between the retainer plate and the one of the driving and driven plate even after the one end portion of the pin has sheared.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a perspective view of one embodiment of a torque transmitting coupler employing the features of the present invention and connected to a conventional screw anchor.

FIG. 2 is an enlarged side elevational view of the coupler of FIG. 1, showing in phantom outline an end of an earth boring auger connected to the coupler.

DETAILED DESCRIPTION OF THE INVENTION

Figure 3:
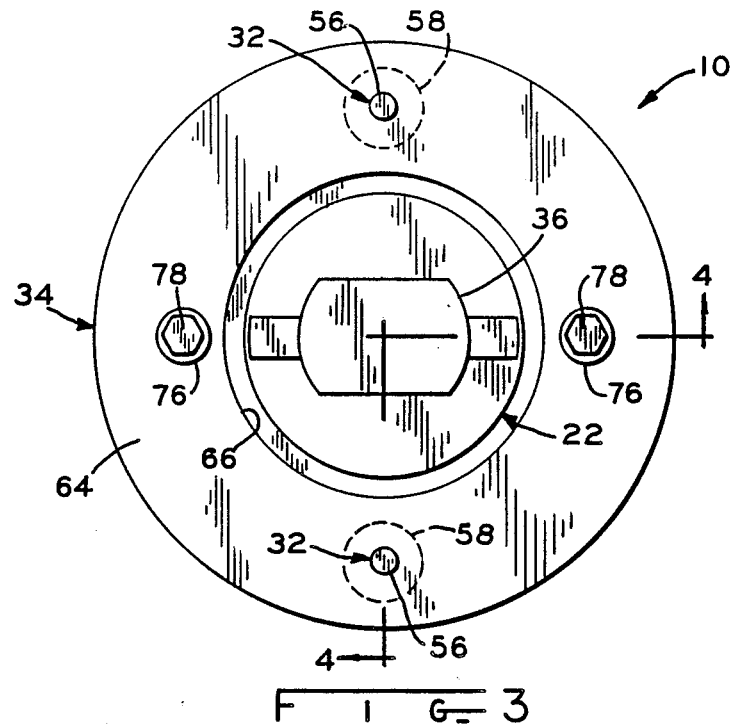
FIG. 3 is a top plan view of the coupler of FIG. 2.

Referring now to the drawings, and particularly to FIG. 1, there is shown a torque transmitting coupler, generally designated by the numeral 10 and constituting the one embodiment of the present invention. The coupler 10 is adapted specifically for use in safely transmitting the torque of a rotary drive mechanism 12 (FIG. 2), such as a utility truck-mounted rotary earth boring auger rotated in either direction, to a rotary driven tool, such as a screw anchor 14, for either setting the screw anchor into the ground or recovering it from the ground. In. FIG. 1, there is seen a typical screw anchor 14. It is composed of an elongated rod 16 having an eye 18 formed on its upper end to which the coupler 10 is connected and a helix-shaped auger blade 20 attached on a pointed lower end of the rod 16.

Figure 4:
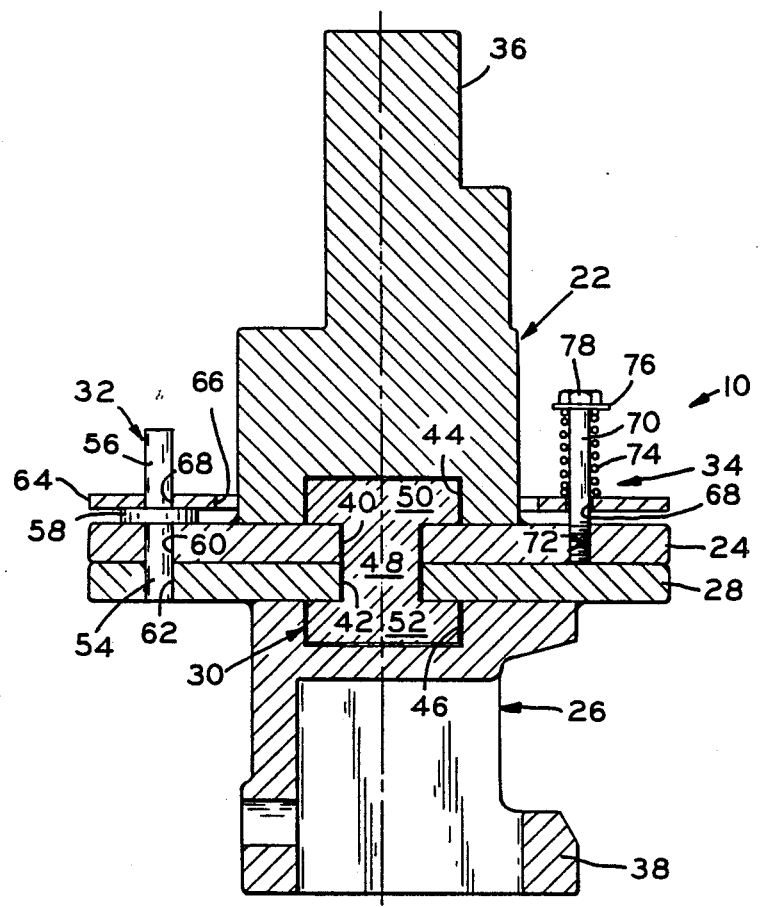
FIG. 4 is a sectional view of the coupler taken along line 4—4 of FIG. 3.

Referring also to FIGS. 2-4, in its basic components the coupler 10 includes a driving member 22, a driving structure in the form of an annular plate 24 on the driving member 22, a driven member 26, a driven structure in the form of an annular plate 28 on the driven member 26, a swivel connecting means 30, a plurality of shearable elements in the form of pins 32, and a shearable pin retaining assembly 34. The driving member 22 is a body with axially spaced outer and inner portions having a drive connector 36 formed on the outer portion and the driving plate 24 rigidly attached on the inner portion. Similarly, the driven member 26 is another separate body with axially spaced outer and inner portions having a tool connector 38 formed on the outer portion and the driven plate 28 rigidly attached on the inner portion. The annular driving and driven plates 24, 28 attached on the respective adjacent inner portions of the driving and driven member 22, 26 encompass and extend radially outwardly from the members.

The swivel connecting means 30 of the coupler 10 interconnects the driving and driven members 22, 26 together in a rotatable coupled relation, as best seen in FIG. 4, at their respective inner portions. Both of the driving and driven plates 24, 28 have central openings 40, 42, and both of the driving and driven members 22, 26 have facing cylindrical recesses 44, 46 formed in their inner portions. The swivel connecting means 30, being generally I-shaped in axial cross-section, has a cylindrical middle portion 48 which extends through the aligned central openings 40, 42 of the plates 24, 28 and opposite cylindrical end portions 50, 52 which seat in the recesses 44, 46 of the members 22, 26.

The diameter of the central openings 40, 42 of the plates 24, 28 and also the diameter of the middle portion 48 of the swivel connecting means 30 are substantially smaller than the diameter of the recesses 44, 46 of the members, 22, 26 and also the diameter of the end portions 50, 52 of the swivel connecting means 30. Thus, it can be readily understood how the swivel connecting means 30 interlocks and connects the respective members 22, 26 together by their respective plates 24, 28 so as to maintain the members and their respective plates in a coupled rotatable relation with respect to one another about a common axis. In such coupled rotatable relation, the driving and driven plates 24, 28 are disposed in an adjacently, contacting, face-to-face relation, as seen in FIGS. 2 and 4. Furthermore, the swivel connecting means 30 so maintains the driving and driven members 22, 26 in such coupled rotatable relation even after shearing of the shearable pins 32. Thus, the members 22, 26 are not allowed to come apart while in use.

The shearable pins 32 of the coupler 10 interconnect or key the driving plate 24 and the driven plate 28 together so as to cause transmitting of torque from the driving member 22 to the driven member 26 via their respective plates 24, 28. However, the pins 32 are designed to control the maximum amount of torque that can be transmitted. In other words, at some given maximum torque load imposed thereon, for example, at 5,000 ft. lb. of torque, the pins 32 will shear to break the transmission of torque or rotary power from the driving member 22 to the driven member 26. When that happens, the swivel connecting means 30 still maintains the members 22, 26 connected together, preventing the driving member 22 and the rotary drive mechanism 12 (the ground boring auger) to which it is attached from pulling away and flailing about in the air and possibly damaging equipment and injuring personnel located nearby.

More particularly, the shearable pins 32 each have opposite end portions 54, 56 extending from opposite sides of a disk 58 fixed about the pin and extending radially outwardly therefrom. The driving and driven plates 24, 28 has respective holes 60, 62 formed therein which are alignable with one another for receiving the lower end portions 54 of the shearable pins 32.

Finally, the retaining assembly 34 of the coupler 10 includes the disks 58 on the pins 32 and an annular retainer plate 64 disposed adjacent and in overlying relation to the driving plate 24. As will be understood, the reason for the presence of the disks 58 on the pins 32 and of the retainer plate 64 is to capture and maintain the shearable pins 32 in operative position with their lower end portions 54 extending through the aligned holes 60, 62 in the driving and the driven plates 24, 28 when the pins 32 are in unsheared states and for retaining the remainder of the pins 32 in a captured state should they become sheared and until they can be replaced. Thus, the retainer plate 64 acts as a safeguard to keep the remainder of the sheared pins from flying off and striking personnel and equipment. The sheared off pieces of the pins do not fly off, but merely drop to the ground from the driven plate 28.

More particularly, the retainer plate 64 has a central opening 66 allowing it to be assembled by being slipped over the driving member 22. The plate 64 also has a plurality of small holes 68 defined therethrough. Some of the holes 68 receive the upper end portions 56 of the shearable pins 32 and other of the holes receive respective ones of a plurality of spring-loaded posts 70 in the form of screws threaded into holes 72 tapped in the driving plate 24. Coil springs 74 are provided to encircle the posts 70 and extend in a compressed state between upper washers 76 located adjacent the heads 78 of the posts and the top surface of the retainer plate 64.

The springs 74 bias the retainer plate 64 toward the driving plate 24 to maintain the pins 32 captured therebetween. However, when it is desired to replace the pins 32, the retainer plate 64 is manually pulled against the bias of the springs 74 away from the driving plate 24, allowing enough space in which to remove and replace the pins 32 without the necessity of first having to disassemble the retainer plate 64 from the driving plate 24.

It should also be understood that due to its configuration and the fact that the end portions 54, 56 of the pins 32 are longer than necessary, the captured once-sheared pins 32 can be turned over and reused once more.

Figure 5:
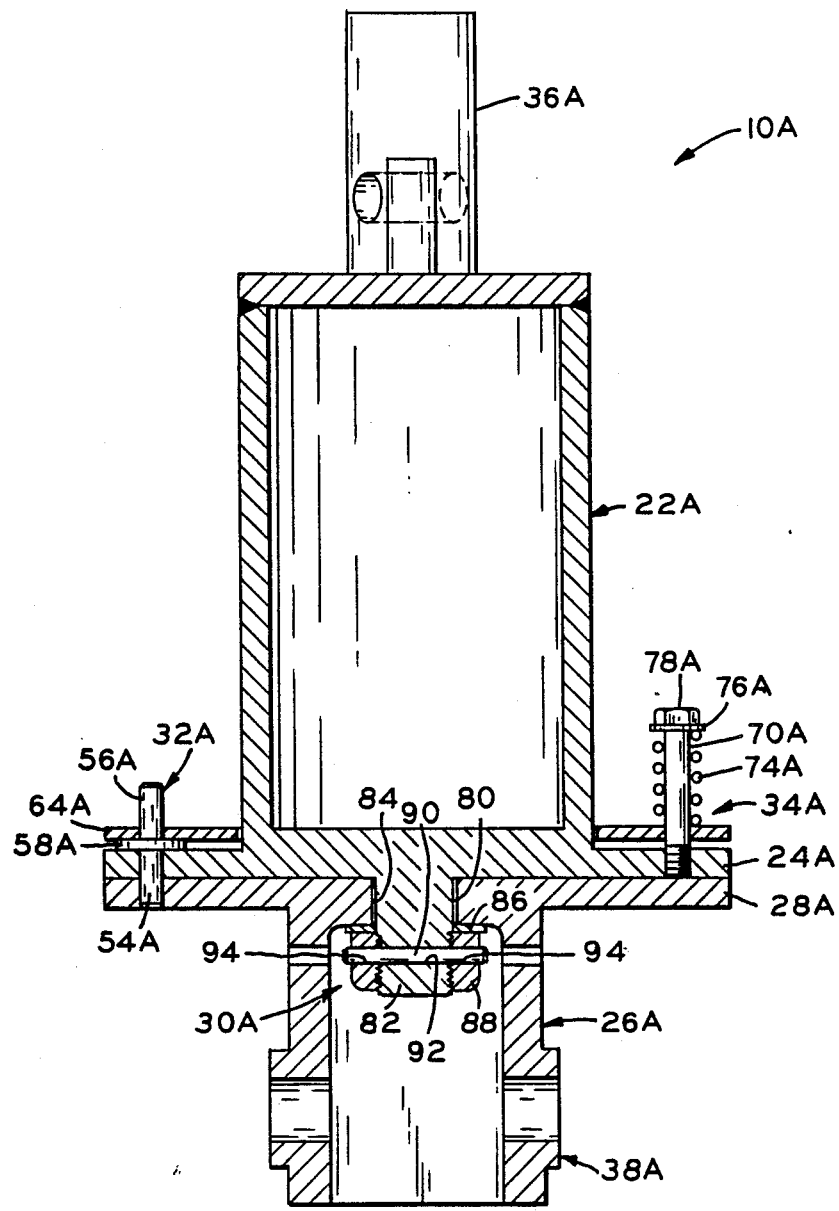
FIG. 5 is a longitudinal sectional view of another embodiment of a torque transmitting coupler employing the feature of the present invention.

Finally, referring now to FIG. 5, there is shown another torque transmitting coupler, generally designated by the numeral 10A and constituting the preferred embodiment of the present invention. The coupler 10A is adapted to transmit torque in the same manner as described previously with respect to coupler 10 of FIGS. 1-4. Furthermore, the basic components of the coupler 10A and the functions thereof are substantially the same as those described previously with respect to coupler 10. Consequently, the same reference numerals accompanied by a suffix "A" have been used to identify them.

Differences do exist between the shapes or configurations of the respective drive and tool connectors 36, 38 and 36A, 38A of the respective driving and driven members 22, 26 and 22A, 26A. However, these differences relate to the relative cost and ease of manufacturability of these components and not to their functions.

The main difference of the coupler 10A from coupler 10 relates to the makeup of the swivel connecting means 30A of the coupler 10A, although its function remains the same. Particularly, the swivel connecting means 30A is composed of a stub shaft 80 fixed to the driving plate 24A of the driving member 22A and projecting axially toward the driven plate 28A of the driven member 26A. The stub shaft 80 is externally threaded about its outer end 82. The swivel connecting means 30A also is composed of a central bore 84 defined in the driven plate 28A of the driven member 26A which is aligned to receive therethrough the stub shaft 80. The length of the stub shaft 80 is greater than the length of the bore 84 so that its threaded outer end 82 is disposed beyond the bore 84. The swivel connecting means 30A further is composed of mounting parts in the form of a washer 86, an internally threaded nut 88 and a locking pin 90, all of which are applied to the stub shaft outer end 82. Both the stub shaft outer end 82 and the nut 88 have openings 92, 94 defined transversely therethrough which when aligned receive the locking pin 90. The locking pin 90 retains the nut 88 at a desired threaded axial position on the stub shaft outer end 82 in which the washer 86, nut 88 and stub shaft 80 rotatably mount the driving and driven plates 24A, 28A of the driving and driven members 22A, 26A together in face-to-face contacting relation but without applying a clamping force thereto. In other words, if the shearable pins 32A (only one being shown) should shear, the members 22A, 26A at their respective plates 24A, 28A will be maintained in face-to-face contacting relation but can undergo relative rotation with respect to one another.

It is thought that the torque transmitting coupler of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A torque transmitting coupler for drivingly connecting a rotary drive mechanism and a rotary driven tool, said torque transmitting coupler comprising:
    (a) a driving member having a driving plate rigidly attached on an inner portion thereof, said driving plate encompassing and extending radially outward from said driving member;
    (b) a driven member having a driven plate rigidly attached on an inner portion thereof, said driven plate encompassing and extending radially outward from said driven member;
    (c) a swivel connecting means inter connecting said driving and said driven members together in a coupled relation at their respective inner portions such that said members are rotatable relative to one another and said respective driving and driven plates thereon are disposed in an adjacent relation to one another;
    (d) at least one shearable element interconnecting said driving and said driven plate together so as to cause transmitting of torque from one of said members to the other via said respective plates, said element being designed to shear at a predetermined torque load imposed thereon by one of said members via its respective plate, said driving and driven plates having respective holes being alignable with each other for receiving a respective and portion of said shearable element;
    (e) retaining means for capturing and maintaining said shearable element adjacent to one of said driving and driven plates both before and after said element has been sheared, said retaining means including a disk attached on said shearable element between its opposite end portions and an annular retainer plate having a hole for receiving one of said end portions of said shearable element;
    (f) said retaining means further including a plurality of spring-loaded posts mounted on one of said driving and driven plates and movably mounting said retainer plate so as to receive the other of said end portions of said shearable element and overlie said disk on said pin, thereby capturing said other shearable element end portion and said disk between said retainer plate and said one of the driving and driven plate even after said one end portion of said pin has sheared;

(g) said swivel connecting means interconnecting said driving and said driven members so as to maintain them together in said coupled relation even after shearing of said shearable element.

2. A torque transmitting coupler for drivingly connecting a rotary drive mechanism and a rotary driven tool, said torque transmitting coupler comprises:

(a) a driving member having opposite inner and outer portions with a drive connector formed on said outer portion thereof and a driving plate rigidly attached on said inner portion thereof;

(b) a driven member having opposite inner and outer portions with a tool connector formed on said outer portion thereof and a driven plate rigidly attached on said inner portion thereof, said driving and driven plate being attached on said respective driving and driven members so as to encompass and extend radially outwardly from said members;

(c) a swivel connecting means interconnecting said driving and driven members together in a coupled relation at their respective inner portions such that said members are rotatable relative to one another about a common axis and said respective driving and driven plates thereon are disposed in a contacting face-to-face relation to one another;

(d) a pair of shearable pins interconnecting said driving and said driven plates together so as to cause transmitting of torque from one of said members to the other via said respective plates, said shearable pins having opposite end portions with a disk attached thereon between said end portions and extending radially outwardly therefrom, said driving and driven plates having respective holes being alignable with one another for receiving one of said end portions of each of said shearable pins, said shearable pins being designed to shear at a predetermined torque load imposed thereon by one of said members via its respective structure;

(e) retaining means disposed adjacent said driving plate for capturing and maintaining said shearable pins adjacent to said driving plate both before and after said pins have been sheared, said retaining means including an annular plate having a hole for receiving the other of said end portions of each of said shearable pins;

(f) said retaining means further including a plurality of spring-loaded posts mounted on said driving plate and movably mounting said retainer plate so as to receive the other of said end portions of said shearable pins and overlie said disks on said pins, thereby capturing said other pin end portions and said disks between said retainer plate and said driving plate even after said one end portion of each of said pins has sheared;

(g) said swivel connecting means interconnecting said driving and driven members so as to maintain them together in said coupled relation even after shearing of said shearable pins.

3. The coupler as recited in claim 2, wherein:
said driving and driven members have cylindrical recesses formed in their inner portions which open and face toward one another;
said driving and driven plates have substantially identical central circular openings defined therethrough and which connect said recesses with one another; and
said swivel connecting means has a middle portion which extends through said openings of said plates and a pair of opposite end portions connected with said middle portion and which seat in said respective recesses of said plates.

4. The coupler as recited in claim 3, wherein the diameters of said central openings of said plates and of said middle portion of said swivel connecting means are smaller than the diameters of said recesses of said members and of said opposite end portions of said swivel connecting means.

5. The coupler as recited in claim 2, wherein said swivel connecting means includes:
a shaft fixed to said driving plate of said driving member and projecting axially along said common axis of said members toward said driven plate of said driven member;
means defining a central bore in said driven plate of the driven member being aligned along said common axis and adapted to receive therethrough said shaft such that an end portion of said shaft extends beyond said driven plate; and
mounting means applied to said shaft end portion so as to rotatably mount said driving and driven plates of said driving and driven members together in said contacting face-to-face relation but without applying a clamping force thereto such that, after shearing of said shearable pins, said members at their respective plates will be maintained in their contacting face-to-face relation but can undergo relative rotation with respect to one another.

6. The coupler as recited in claim 5, wherein said mounting means includes:
a fastener attachable on said shaft end portion, said fastener and shaft end portion having respective openings defined transversely therethrough which are aligned when said fastener is attached on said shaft end portion at a desired axial position therealong which maintains said plates of said members in their desired contacting face-to-face relation; and
a locking pin removably installable through said aligned openings in said shaft end portion and fastener for retaining said fastener at said desired position along said shaft end portion.

* * * * *